(12) United States Patent
Suzuki

(10) Patent No.: US 6,296,469 B1
(45) Date of Patent: Oct. 2, 2001

(54) PRODUCING APPARATUS OF FILM WITH THROUGH-HOLES

(75) Inventor: Minoru Suzuki, Tochigi-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/167,572

(22) Filed: Oct. 7, 1998

(30) Foreign Application Priority Data

Oct. 9, 1997 (JP) .................................................... 9-293484

(51) Int. Cl.[7] .............................. B26D 1/40; B26D 7/10; B26F 1/00; B26F 1/24; B26F 1/38
(52) U.S. Cl. .................... 425/290; 425/324.1; 425/335; 425/363; 425/471
(58) Field of Search .............................. 425/290, 324.1, 425/335, 363, 471; 264/230

(56) References Cited

U.S. PATENT DOCUMENTS

| | | | |
|---|---|---|---|
| 3,355,974 | * 12/1967 | Carmichael | 83/171 |
| 3,546,742 | * 12/1970 | Kugler | 425/196 |
| 3,744,106 | * 7/1973 | Baum et al. | 26/106 |
| 3,819,465 | * 6/1974 | Parsons et al. | 428/176 |
| 4,432,917 | * 2/1984 | Hungerford | 264/40.1 |
| 4,859,519 | * 8/1989 | Cabe, Jr. et al. | 428/131 |
| 5,554,250 | * 9/1996 | Dais et al. | 156/353 |

FOREIGN PATENT DOCUMENTS

| | | |
|---|---|---|
| 0719994 | 7/1996 | (EP) . |
| 832763 | 1/1956 | (GB) . |
| 832 763 | * 1/1956 | (GB) . |
| 767 697 | * 2/1957 | (GB) . |
| 1 120 578 | * 7/1968 | (GB) . |
| 1120578 | 7/1968 | (GB) . |
| 767697 | 9/1996 | (GB) . |
| 5-305666 | * 11/1993 | (JP) . |
| 5305666 | 11/1993 | (JP) . |
| 8-49960 | * 2/1996 | (JP) . |

OTHER PUBLICATIONS

An English language abstract of JP 5–305666.
An English language abstract of JP 8–49960.

* cited by examiner

Primary Examiner—Nam Nguyen
Assistant Examiner—Donald Heckenberg
(74) Attorney, Agent, or Firm—Greenblum & Bernstein, P.L.C.

(57) ABSTRACT

A producing apparatus of a film with through-holes includes a pair of stretching rollers which sandwich a film therebetween and stretch the film. The producing apparatus further includes a pair of punching rollers which sandwich the film therebetween and punch through-holes in the film. At least one of the punching rollers has projections formed on an outer surface thereof. The stretching rollers and the punching rollers are disposed so that the film stretched by the stretching rollers are fed to the punching rollers.

10 Claims, 5 Drawing Sheets

PRODUCING APPARATUS OF FILM WITH THROUGH-HOLES

BACKGROUND OF THE INVENTION

This invention relates to a producing apparatus and a producing method of a film with through-holes.

In order to make a thin film (for example, 0.03 to 0.08 mm in thick) with through-holes, a stretching apparatus and a punching apparatus are generally used. A thicker plastic film is heated and stretched to a target thickness by means of a stretching apparatus. Then, through-holes are punched in the plastic film by means of the punching apparatus.

However, since separate two apparatus (that is, the stretching apparatus and the punching apparatus) are needed, the whole equipment for producing the film with through-holes is complicated. Further, since the conventional producing method necessities separate two processes (that is, the stretching process and the punching process), the whole process for producing the film with through-holes is complicated.

SUMMARY OF THE INVENTION

It is therefore an object of the present invention to simplify the whole equipment and whole process for producing the film with through-holes.

According to an aspect of the present invention, there is provided a producing apparatus of a film with through-holes including (1) a pair of stretching rollers which sandwich a film therebetween and stretch the film, and (2) a pair of punching rollers at least one of which has projections formed on an outer surface thereof, which sandwich the film therebetween and punch through-holes in the film. The stretching rollers and the punching rollers are disposed so that the film stretched by the stretching rollers are fed into the punching rollers.

With such an arrangement, since the stretching of the film and the punching of the through-holes are performed by substantially one apparatus, the whole equipment for producing the film with through-holes becomes simple.

In a particular arrangement, the film is made of shape memory resin. The producing apparatus further includes a first heater which heats the film to a temperature above the shape providing temperature. Above the shape providing temperature, the shape memory resin exhibits a fluidized state. Thus, the film is easily deformed by the stretching rollers. It is preferred that the first heater is mounted in at least one of the stretching rollers.

Further, the producing apparatus includes a second heater which heats the film to a temperature above the glass transition temperature. Above the glass transition temperature (but below the shape providing temperature), the shape memory resin exhibits a rubber state (that is, an elastic state). Thus, the through-holes can easily be formed in the film. It is preferred that the second heater is mounted in at least one of the punching rollers.

Optionally, the producing apparatus further includes a cooling device provided between the punching rollers and the stretching rollers. The cooling device cools the film to a temperature below the shape providing temperature.

In a preferred embodiment, there is provided a method for producing a film with through-holes using the above-described producing apparatus. The method includes the steps of (1) stretching the film by means of the stretching rollers, and (2) punching through-holes in the film in a state the film is stretched.

With such a method, since the since the stretching of the film and the punching of the through-holes are performed in substantially one continuous process, the whole process of producing the film with through-holes becomes simple.

In case the film is made of shape memory resin, the film is heated to a temperature above a shape providing temperature of the shape memory resin, in the stretching step. Further, the film is heated to a temperature above a glass transition temperature of the shape memory resin in the punching step. It is also possible to cool the film below a shape providing temperature of the shape memory resin, after the stretching step.

DESCRIPTION OF THE PREFERRED EMBODIMENT

The embodiment of the producing apparatus and method of a film with through-holes according to the present invention is described below.

Figure 1:
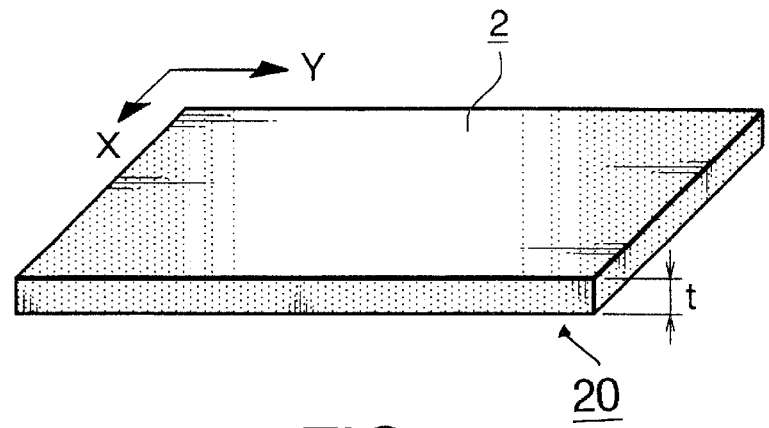
FIG. 1 is a perspective view of a film from which a film with through-holes is formed.
Figure 2:
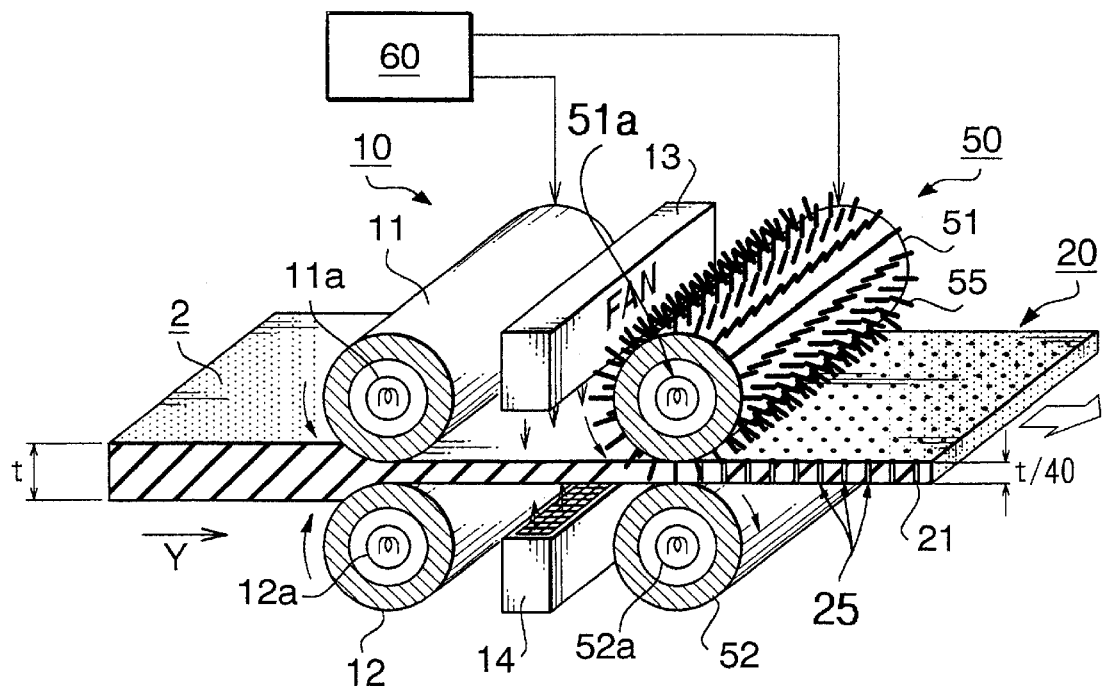
FIG. 2 is a schematic view of a producing apparatus according to the embodiment of the present invention.

FIG. 1 is a perspective view of a film 20 from which a film with through-holes is produced. FIG. 2 is a schematic view showing a producing apparatus of a film with through-holes according to the first embodiment. The film 20 shown in FIG. 1 is made of shape memory resin and has a square shape, each side thereof having the length L. The thickness t of the film 20 is from 1 to 4 mm. In FIG. 1, X-direction and Y-direction are defined along two adjacent sides of the film 20.

Figure 3:
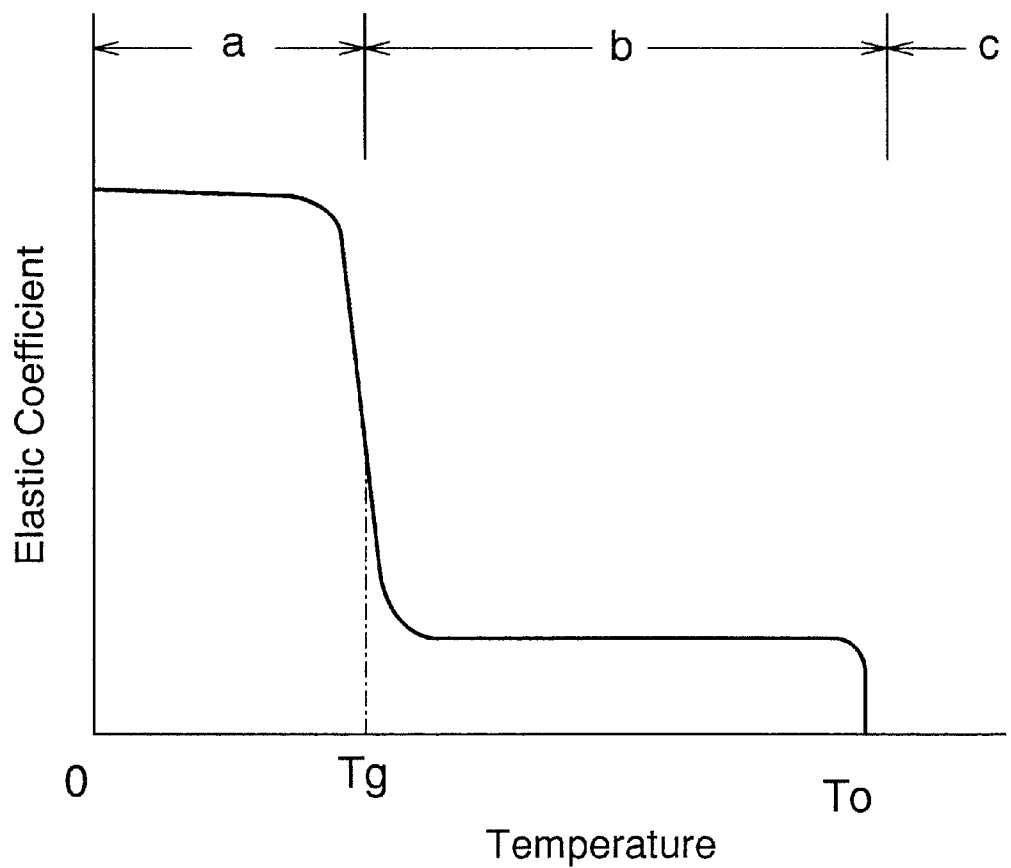
FIG. 3 is a diagram showing an example of a characteristic of a shape memory resin.

The shape memory resin exhibits different characteristics above/below a glass transition temperature $T_g$. FIG. 3 is a diagram showing an example of the characteristics of the shape memory resin. When the shape memory resin is heated to a temperature above a glass transition temperature $T_g$ (and below a shape-providing temperature $T_o$ described below) as shown by "b" in FIG. 3, the shape memory resin exhibits a rubber state (that is, an elastic state), in which Brownian motion of molecules is activated. When the shape memory resin is cooled to a temperature below the glass transition temperature $T_g$ as shown by "a" in FIG. 3, the shape memory resin exhibits a solid state in which Brownian motion of molecules is frozen. Further, if the shape memory resin is heated to a temperature above a shape-providing-temperature $T_o$ as shown by "c" in FIG. 3, the shape memory resin exhibits a fluidized state in which molecules are fluidized. In this fluidized state, the shape memory resin is given an original shape.

Examples of the shape memory resin are as follows: (1) polynorbornene, (2) trans-1,4-polyisoprene, and (3) polyurethane. In general, the glass transition temperature $T_g$ of the shape memory resin is from 50 to 130 degree centigrade (°C.). In this embodiment, polyurethane resin (which is low cost and has excellent moldability) is used. Further, in this embodiment, the glass transition temperature $T_g$ of the shape memory resin is 60° C. The shape memory resin is disclosed in Japanese Laid-Open Patent Application Nos. HEI 5-305666 and HEI 8-49960, teachings of which are incorporated herein by reference in their entireties.

As shown in FIG. 2, a stretching roller pair 10 is provided for stretching the film 20, including the upper and lower rollers 11 and 12 faced with each other. A punching roller pair 50 are provided for punching through-holes in the film 20, including a needle roller 51 and a platen roller 52 faced with each other. The stretching roller pair 10 and the punching roller pair 50 are disposed in parallel to each other.

The upper roller 11 of the stretching roller pair 10 is rotated counterclockwise, while the lower roller 12 is rotated clockwise. The needle roller 51 of the punching roller pair 50 is rotated counterclockwise, while the platen roller 52 is rotated clockwise. The stretching roller pair 10 and the punching roller pair 50 are driven by a common driving mechanism 60 and rotated at the same circumferential velocity.

The film 20 is inserted in a gap between the stretching roller pair 10 in Y-direction. The upper and lower rollers 11 and 12 respectively have built-in heater 11a and 12a and heated at 150° C., which is higher than the shape-providing temperature $T_o$ of the shape memory resin of the film 20. The film 20 is heated so that the film 20 exhibits a fluidized states and pressed by the stretching roller pair 10, so that the film 20 is stretched in Y-direction. The film 20 is stretched so that the thickness of the film 20 is 0.03 to 0.08 mm (t/40). Since the film 20 is heated to a temperature above the shape-providing temperature $T_o$, the thickness (0.03 to 0.08 mm) of the film 20 is maintained after the applied head and pressure are removed.

A pair of fans 13 and 14 are located at downstream side of the heat rollers 11 and 12. The film 20 which moves out of the gap between the heat rollers 11 and 12 is rapidly cooled by fans 13 and 14 to a temperature below the glass transition temperature $T_g$. The purpose of the provision of the fans 13 and 14 is to cool the film 20 at least below the shape providing temperature $T_o$ immediately after the film 20 is stretched. Thus, it is prevented that a shape is unintentionally given to the film 20 after the stretching.

The punching roller pair 50 is disposed so that the film 20 discharged from the stretching roller pair 10 is fed into the punching roller pair 50. The needle roller 51 is provided with needles planted throughout the outer surface thereof. The needle 55 is long enough to penetrate the film 20. The film 20 is fed in a gap between the needle roller 51 and the platen roller 52. The needle roller 51 and the platen roller 52 respectively have built-in heaters 51a and 52a and are heated at 70° C., which is higher than the glass transition temperature $T_g$ of the shape memory resin. The film 20 is heated so that the film 20 exhibits a rubber state (that is, an elastic state). In this state, the film 20 is pressed by the needle roller 51 and the platen roller 52.

The needles 55 planted on the outer surface of the needle roller 50 pierce the film 20 (which is in the rubber state), so that the through-holes 25 are punched in the film 20 by the needles 55. Since the axial length of the needle roller 50 (covered by the needles 55) is the same as the width of the film 20, the through-holes 25 are formed throughout the surface of the film 20. The needle 55 is of a diameter that permits the through-hole 25 to substantially close after formation. Since the film 20 is in an elastic state, just after the needle 55 moves out of the through-hole 25, the through-hole 25 is contracted and substantially closed due to the elastic force.

The film 20 which moves out of the punching roller pair 50 is cooled by surrounding atmosphere, to a temperature below the glass transition temperature $T_g$ of the shape memory resin. With this, the film 20 with through-hole 25 is produced.

According to the above-described embodiment, the stretching of the film 20 and the punching of the through-holes 25 are performed by substantially one process shown in FIG. 2. Thus, the whole process is simplified. Further, since the stretching of the film 20 and the punching of the through-holes 25 are performed by substantially one apparatus shown in FIG. 2, the equipment for producing the film with through-holes is simplified.

In the above-described producing method, if the punching roller pair 50 is sufficiently apart from the stretching roller pair 10 so that the temperature of the film 20 (at the punching roller pair 50) is cooled by an atmosphere to a temperature at least below the shape providing temperature $T_o$, it is not necessary to provide the fans 13 and 14. Conversely, in case the fans 13 and 14 are provided between the stretching roller pair 10 and the punching roller pair 50 as shown in FIG. 2, the distance between the stretching roller pair 10 and the punching roller pair 50 can be minimized.

In the above-described embodiment, it is possible to form the through-holes 25 so that the through-holes 25 are inclines with respect to the thickness of the film 20. In such case, the needles 55 are provided to the needle roller 51 so that the needles 55 are inclined with respect to the outer surface of the needle roller 50. Further, the needle 55 of the needle roller 51 can be replaced with projections.

Further, in a modification of the above-described embodiment, the film 20 is made of a plastic such as polytetrafluoroethylene (Teflon (trademark)). In such case, the temperatures of the stretching roller pair 10 and the punching roller pair 50 are determined according to the heating characteristic of the plastic.

Figure 4:
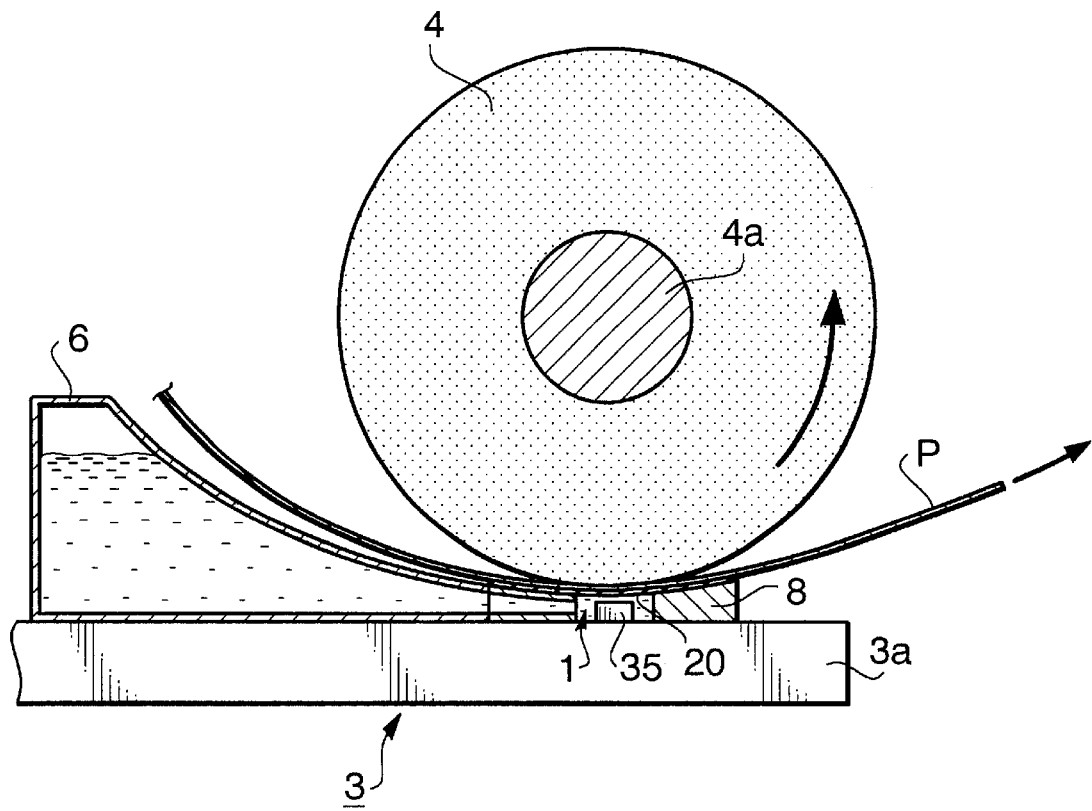
FIG. 4 is a sectional view of a ink transfer printer using the film produced by the producing method of FIG. 2.

An ink transfer printer using the film 20 is described. FIG. 4 is a sectional view of the ink transfer printer. The ink transfer printer includes a thermal line head 3 having multiple of heating elements 35 arranged in a row. The above-described film 20 with through-holes (not shown in FIG. 3) is supported by a board 3a of the thermal line head 3 via a spacer 8 provided therebetween, so that the film 20 and the thermal line head 3 are faced with each other.

The spacer 8 and the board 3a of the thermal line head 3 are made of materials which do not allow the permeation of ink. Thus, ink is stored in a space surrounded by the spacer 8, the board 3a of the thermal line head 3 and the film 20. A platen roller 4 is provided at the opposing side of the film 20 with respect to the thermal line head 3, so that a recording media R is sandwiched by the platen roller 4 and the film 20. The circumferential surface of the platen roller 4 is made of rubber. The rotation shaft 4a of the platen roller 4 is orientated in a direction in which the heating elements 35 of the thermal line head 3 are arranged. When the platen roller 4 is rotated, the recording media R is fed in the direction shown by an arrow in FIG. 4, due to a traction between the recording media R and platen roller 4.

Figure 5:
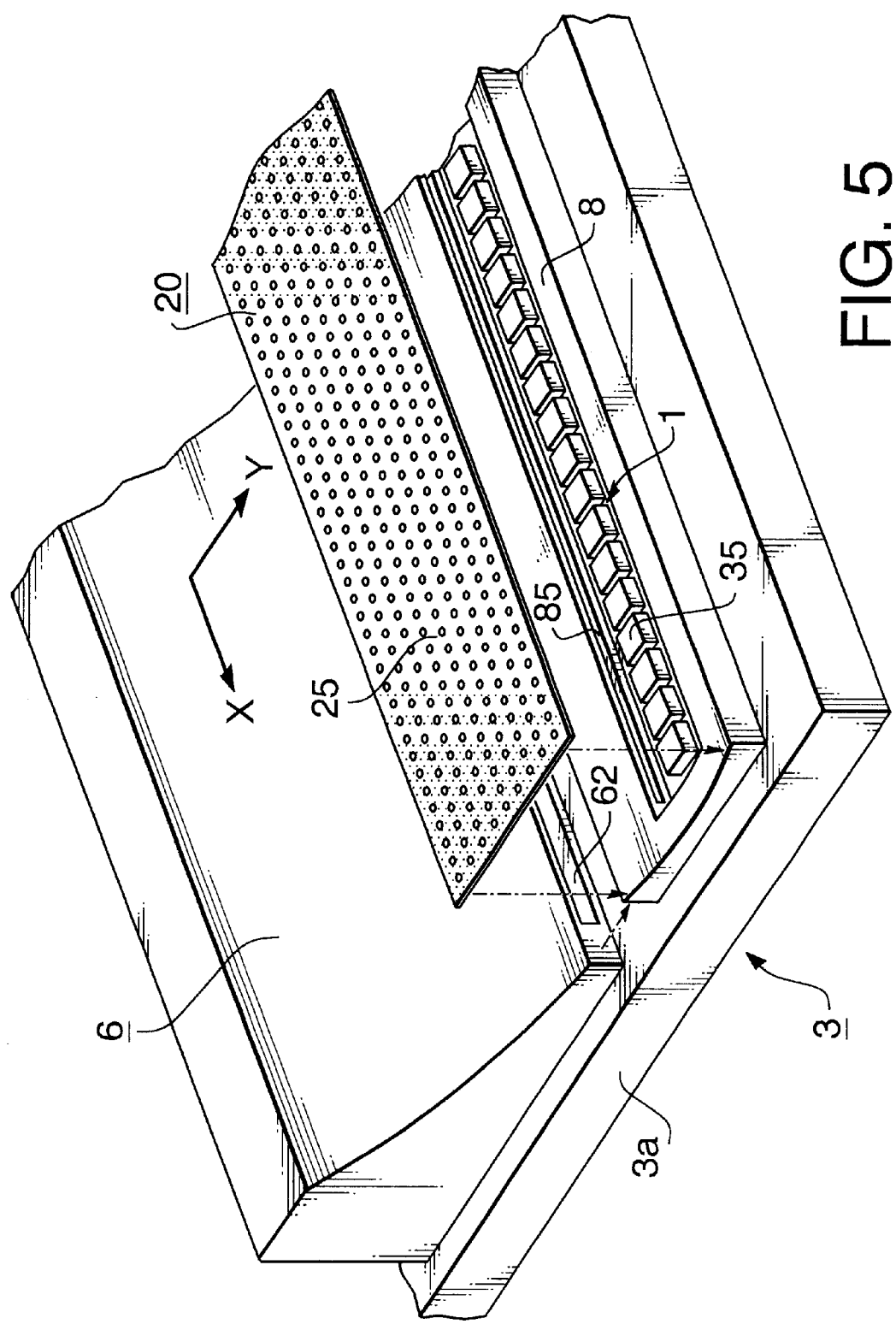
FIG. 5 is an exploded perspective view showing a main part of the ink transfer printer of FIG. 4.

FIG. 5 is an exploded perspective view of the ink transfer printer except the platen roller 4. The spacer 8 is a thin plate member which surrounds the heating elements 35 of the thermal line head 3. That is, the spacer 8 defines four side borders of the ink space 1 in which the heating elements 35 are located. In order to supply ink to the ink space 1, an ink tank 6 is provided on the board 3a of the thermal line head 3 so that the ink tank 6 is adjacent to the spacer 8. The ink tank 6 has a not-shown cavity in which ink can be stored. Ink stored in the ink tank 6 is introduced into the ink space 1 through a slit-shaped outlet opening 62 formed on the ink tank 6 and a slit-shaped connecting opening 85 formed on the spacer 8, due to a capillary action. The film 20 is attached to the upper surface of the spacer 8 so that the through-holes 25 are faced with the heating elements 35 of the thermal line head 3.

Figure 6A:
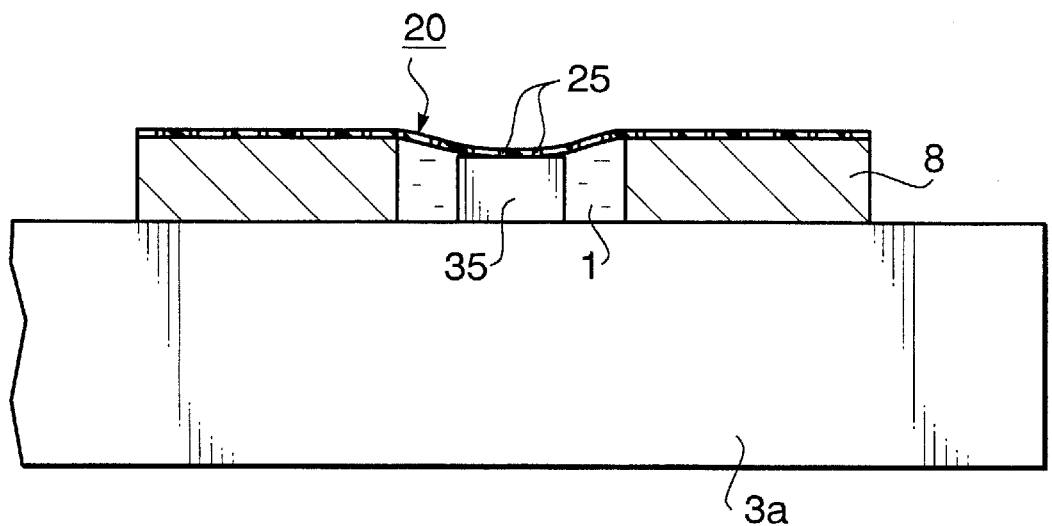
FIGS. 6A and 6B are schematic views illustrating ink transferring process of the ink transfer printer of FIG. 4.
Figure 6B:
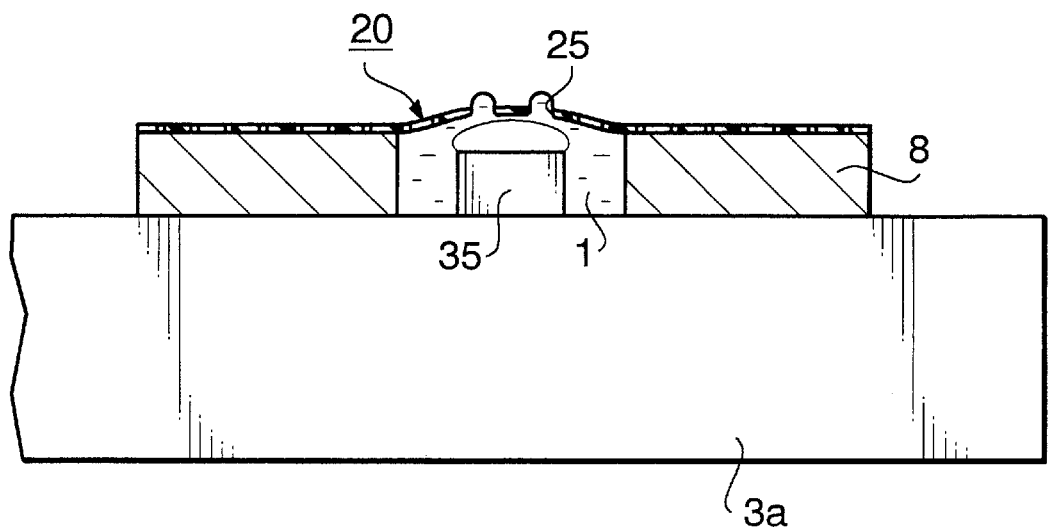

FIGS. 6A and 6B are schematic views showing an ink transferring process. As shown in FIG. 6A, the diameters of the through-holes 25 are small so that ink does not permeate the through-holes 25. The film 20 is almost in contact with the heating element 35 of the thermal line head 3. When the heating element 35 is heated, ink located in the vicinity of the heating element 35 is heated. As shown in FIG. 6B, the heated ink is vaporized and expanded, causing an increase in the local pressure of ink. Also, a portion of the film 20 located in the vicinity of the heating element 35 is heated. The elastic coefficient of the heated portion of the film 20 decreases, so that the heated portion of the film 20 is easily deformed. Due to the increase in the local pressure in ink, ink is pushed into the through-hole 25 of the film 20. Further, the through-hole 25 is widen so as to allow the permeation of ink. With this, ink permeates the through-hole 25 and is transferred onto the recording media R (FIG. 4) which is in contact with the upper surface of the film 20. After the heating of the heating elements 35 is stopped, the heated ink is cooled by the surrounding ink, so that the increase in the local pressure in ink disappears. Further, the heated portion of the film is also cooled by ink. With this, the widened through-holes 25 recover their original diameters so that the through-holes 25 do not allow the permeation of ink.

As constructed above, by controlling the thermal line head 3 to selectively heat the heating elements 35 and by rotating the platen roller 4 to feed the recording media R, a desired image is formed on the recording media R.

In the above-described ink transfer printer, if the glass transition temperature $T_g$ of the film 20 is too high, an energy consumption of the ink transfer printer may increase. Conversely, if the glass transition temperature $T_g$ of the film 20 is too low, the through-holes 25 may unintentionally open when the temperature of the environment of the printer, particularly in summer. Thus, it is preferable that the glass transition temperature $T_g$ of the film 20 is from 50 to 80° C. (as long as the heating temperature of the punching roller pair 50 shown in FIG. 2 is set to a temperature higher than the glass transition temperature $T_g$ of the film 20).

Although the producing apparatus and producing method of a film with through-holes are described herein with respect to the preferred embodiment, many modifications and changes can be made without departing from the spirit and scope of the invention.

The present disclosure relates to subject matters contained in Japanese Patent Application No. HEI 09-293484, filed on Oct. 9, 1997, which is expressly incorporated herein by reference in its entirety.

What is claimed is:

1. A producing apparatus configured to produce a printer ink transfer film as a shape memory film with through-holes useable for printer ink transfer, the shape memory film being made of a shape memory resin, said producing apparatus comprising:

a pair of stretching rollers which sandwich the shape memory film therebetween and stretch the shape memory film in at least one direction;

at least one first heater provided in a region of at least one of said stretching rollers, which heats said film to a temperature above a shape providing temperature of the shape memory resin;

a pair of punching rollers, at least one of which has projections formed on an outer surface thereof, which sandwich the shape memory film therebetween and punch through-holes therethrough in the shape memory film; and at least one second heater provided in a region of at least one of said punching rollers, which heats the shape memory film to a temperature above a glass transition temperature of the shape memory resin while the through-holes are punched therethrough.

2. The producing apparatus according to claim 1, said stretching rollers and said punching rollers being disposed so that the shape memory film stretched by said stretching rollers is fed to said punching rollers.

3. The producing apparatus according to claim 1, wherein said first heater is mounted within at least one of said stretching rollers.

4. The producing apparatus according to claim 1, wherein said second heater is mounted within at least one of said punching rollers.

5. The producing apparatus according to claim 1, further comprising a cooling device provided between said punching rollers and said stretching rollers, said cooling device cooling the shape memory film to a temperature below the shape providing temperature.

6. The producing apparatus according to claim 1, wherein said punching rollers are disposed downstream of said stretching rollers along a direction of said stretching of the shape memory film.

7. The producing apparatus according to claim 1, wherein said projections are needles planted on an outer surface of said at least one of said punching rollers.

8. The producing apparatus according to claim 1, wherein said punching rollers are parallel to said stretching rollers.

9. The producing apparatus according to claim 1, wherein the glass transition temperature of the shape memory resin is from 50 to 80° C.

10. The producing apparatus according to claim 1, wherein the glass transition temperature of said shape memory resin is below the shape providing temperature, and wherein said at least one second heater heats an unpunched said shape memory film to a temperature above the glass transition temperature but below the shape providing temperature of the shape memory resin while said through-holes are punched therethrough.

* * * * *